United States Patent
Yoshikawa et al.

(10) Patent No.: US 6,973,982 B2
(45) Date of Patent: Dec. 13, 2005

(54) MOTOR STRUCTURE OF AN ELECTRIC VEHICLE

(75) Inventors: Mamoru Yoshikawa, Saitama (JP); Hiroyuki Sato, Saitama (JP); Kiyoshi Kimura, Saitama (JP); Seiichi Mogi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,082

(22) Filed: Aug. 16, 2002

(65) Prior Publication Data
US 2003/0042053 A1 Mar. 6, 2003

(30) Foreign Application Priority Data
Aug. 31, 2001 (JP) .............................. 2001-264768

(51) Int. Cl.⁷ ................................................ B60K 1/00
(52) U.S. Cl. .................................. 180/65.3; 180/65.6
(58) Field of Search .............................. 180/65.1, 65.2, 180/65.3, 65.6, 65.8; 310/52, 53, 54, 64; 475/202, 206

(56) References Cited
U.S. PATENT DOCUMENTS

| 5,443,130 A | * | 8/1995 | Tanaka et al. | ............. 180/65.6 |
| 5,585,681 A | * | 12/1996 | Bitsche | ......................... 310/54 |
| 5,632,157 A | | 5/1997 | Sekino et al. | ................... 62/244 |
| 5,641,031 A | * | 6/1997 | Riemer et al. | ............. 180/65.3 |
| 5,662,184 A | | 9/1997 | Riemer et al. | ............. 180/65.1 |
| 5,807,180 A | * | 9/1998 | Knodle et al. | .............. 464/139 |
| 6,053,266 A | * | 4/2000 | Greenhill et al. | .......... 180/65.3 |
| 6,059,684 A | * | 5/2000 | Sasaki et al. | ................ 475/206 |
| 6,223,843 B1 | * | 5/2001 | O'Connell et al. | ........ 180/65.3 |
| 6,260,644 B1 | * | 7/2001 | Otsu | ........................ 180/65.3 |
| 6,378,637 B1 | * | 4/2002 | Ono et al. | .................. 180/65.3 |

* cited by examiner

*Primary Examiner*—Christopher P Ellis
*Assistant Examiner*—Christopher Bottorff
(74) *Attorney, Agent, or Firm*—Lahive & Cockfield, LLP; Anthony A. Laurentano, Esq.

(57) ABSTRACT

A motor structure of an electric vehicle which is driven by an electric motor. The motor structure comprises an electric motor unit including the electric motor and differential gears, and a radiator for cooling the electric vehicle. Accessories are mounted on the electric motor unit. The radiator is positioned at a front side of the electric vehicle and in front of the electric motor unit. In this motor structure, one of universal joints, each of which connects a drive shaft on the differential gears side and a drive shaft on a wheel side, is adjacent to a side of the electric motor, which is in the form of a cylinder.

14 Claims, 6 Drawing Sheets

B ELECTRIC MOTOR UNIT
(1: ELECTRIC MOTOR, 2: TRANSMISSION, 3: DIFFERENTIAL GEARS)

MOTOR STRUCTURE OF AN ELECTRIC VEHICLE

FIELD OF THE INVENTION

The present invention relates to a motor structure of an electric vehicle, which requires less install space upon installing an electric motor unit in a motor room.

BACKGROUND OF THE INVENTION

Electric vehicles equipped with an accumulator battery or a fuel cell and driven by a traction motor has been drawn attention because they do not emit carbon dioxide gas during the running. Electric vehicles are provided with an electric motor in a motor room and a driving force generated at the electric motor is transmitted to driving wheels via a transmission, differential gears, and universal joints.

FIG. 6 is a schematic plan view of a conventional electric motor unit consisting of an electric motor, a transmission, and differential gears. As seen in this figure, the electric motor 101 and the differential gears 103, which form the electric motor unit B, are arranged such that a rotating shaft 101a of the electric motor 101 and drive shafts 103a, 104a extending from the differential gears 103 are positioned parallel to each other.

In this figure, reference numerals 102 and 104 designate a transmission and a universal joint, respectively. A referential numeral L' designates a distance between the shafts 101a and 104a (101a and 103a) when viewing from above. Herein, the reference numeral 103a designates a shaft on the differential gears side and the reference numeral 104a designates a drive shaft on a wheel side.

When considering a collision of a vehicle, it is preferable that the vehicle is provided with a larger crushable zone for absorption of impact. More free space in the motor room is also desired in terms of maintenance. Also, improving the air distribution of the radiator is desired in terms of cooling the motor. Further, it is desired to improve the comfortability with extended vehicle compartment space. Therefore, less install space of the equipment is required in the motor room of the electric vehicle equipped with the electric motor unit B such as illustrated in FIG. 6.

In view of the above, the purpose of the present invention is to provide a motor structure of an electric vehicle, which requires less install space.

SUMMARY OF THE INVENTION

According to a first aspect of the invention, there is provided a motor structure of an electric vehicle which is driven by an electric motor. The motor structure comprises an electric motor unit including the electric motor and differential gears, and a radiator as cooling means of the electric vehicle. Accessories are mounted on the electric motor unit. The radiator is positioned at a front side of the electric vehicle and in front of the electric motor unit. In this motor structure, one of universal joints, each of which connects a drive shaft on the differential gears side and a drive shaft on a wheel side, is adjacent to a side of the electric motor in the form of a cylinder.

Herein, the term "side of the electric motor" indicates either right or left side of the electric motor (side facing either one of the driving wheels), as shown in the preferred embodiment to be described later, when mounted on the electric vehicle, and to be more specific, at a side surface of the electric motor, where the transmission and the differential gears are not arranged. In this structure, since the side surface of the electric motor can be utilized to fix one of the universal joints, it is possible that the universal joints are positioned adjacently to the electric motor, thereby decreasing the distance between the shaft of the electric motor and the shafts of the driving wheels. Further, if accessories are positioned above the electric motor, more space is available in the fore and aft direction of the electric motor. Herein, the term "one of universal joints" indicates one of the right and left universal joints, and the term "cylinder" includes not only a complete cylinder but also other shapes such as barrel, square column, and the like.

According to a second aspect of the invention, the aforementioned electric motor may be driven by a fuel cell and the accessories may include a power control unit controlling electric power from the fuel cell and an intake system supplying air to the fuel cell.

In this structure, sufficient space is retained, for example, in the motor room of a fuel cell electric vehicle provided with a variety of equipment. Further, it is possible to cool down the fuel cell reliably even though the temperature of generated heat is low in the fuel cell and effective cooling is difficult.

According to a third aspect of the invention, in the aforementioned motor structure, drive shafts on right and left wheel sides may have substantially the same length.

In this structure, since the same torsion amount occurs in both drive shafts on right and left wheel sides, the running behavior of the vehicle will be stable during the drive of the vehicle.

BRIEF DESCRIPTION OF THE DRAWINGS

A preferred embodiment of the present invention will be described below, by way of example only, with reference to the accompanying drawings, in which:

FIGS. 5A and 5B are views explaining the air distribution of a radiator shown in FIG. 1, wherein FIG. 5A is a diagrammatical sectional plan view of a motor room and FIG. 5B is a diagrammatical sectional side view of the motor room.

DESCRIPTION OF THE PREFERRED EMBODIMENT

With reference to the accompanying drawings, a preferred embodiment of the invention will be described.

Figure 1:
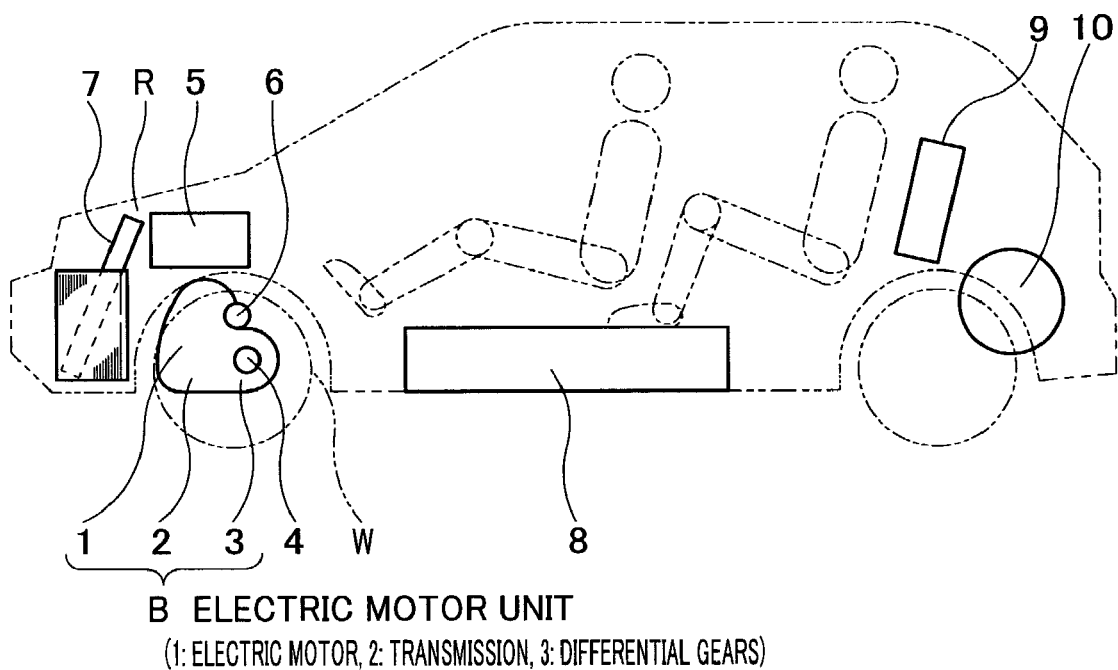
FIG. 1 is a diagrammatical vertical sectional view of a fuel cell electric vehicle to which is applied a motor structure according to the invention.
Figure 2:
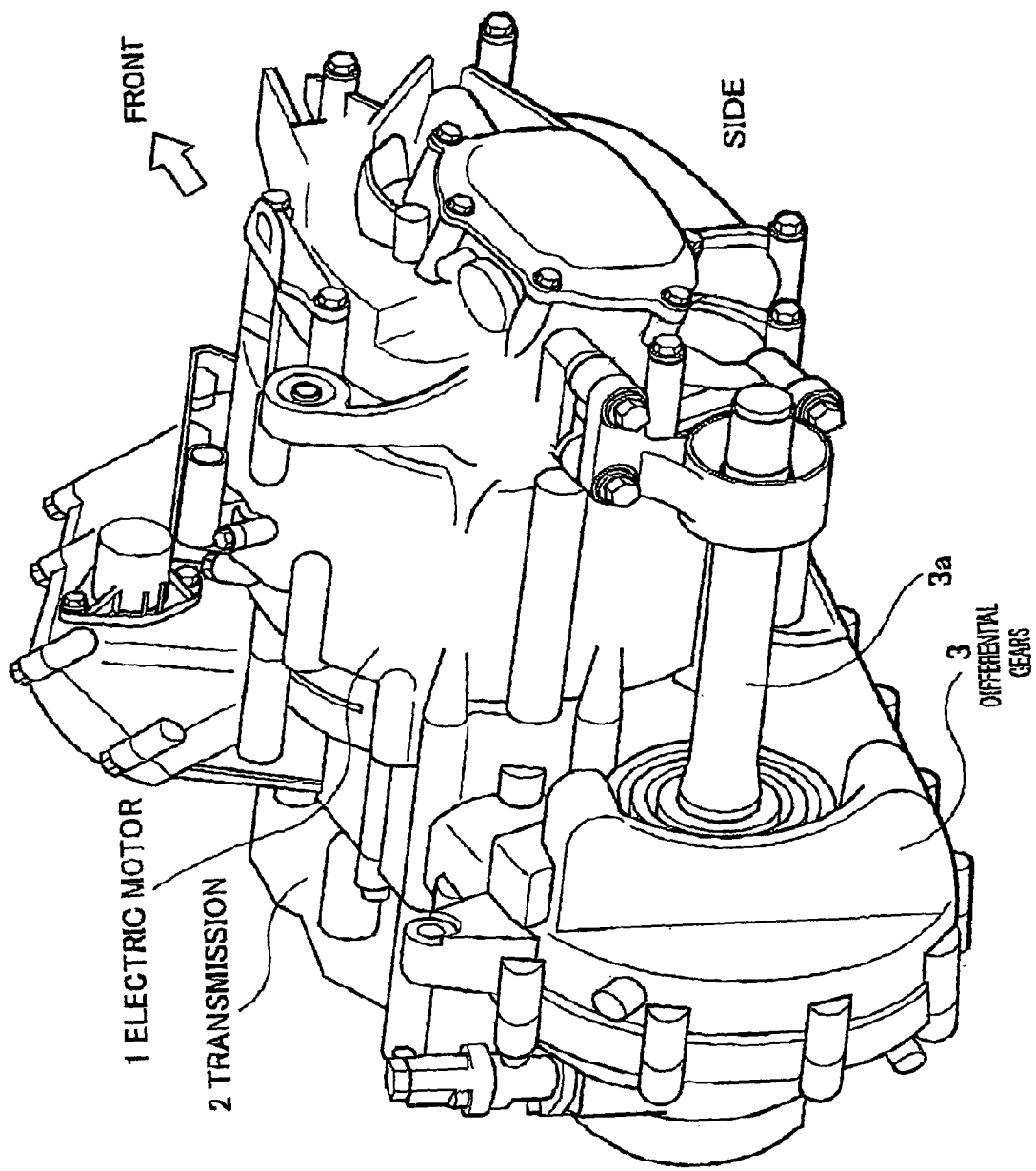
FIG. 2 is a perspective view of an electric motor unit shown in FIG. 1.
Figure 3:
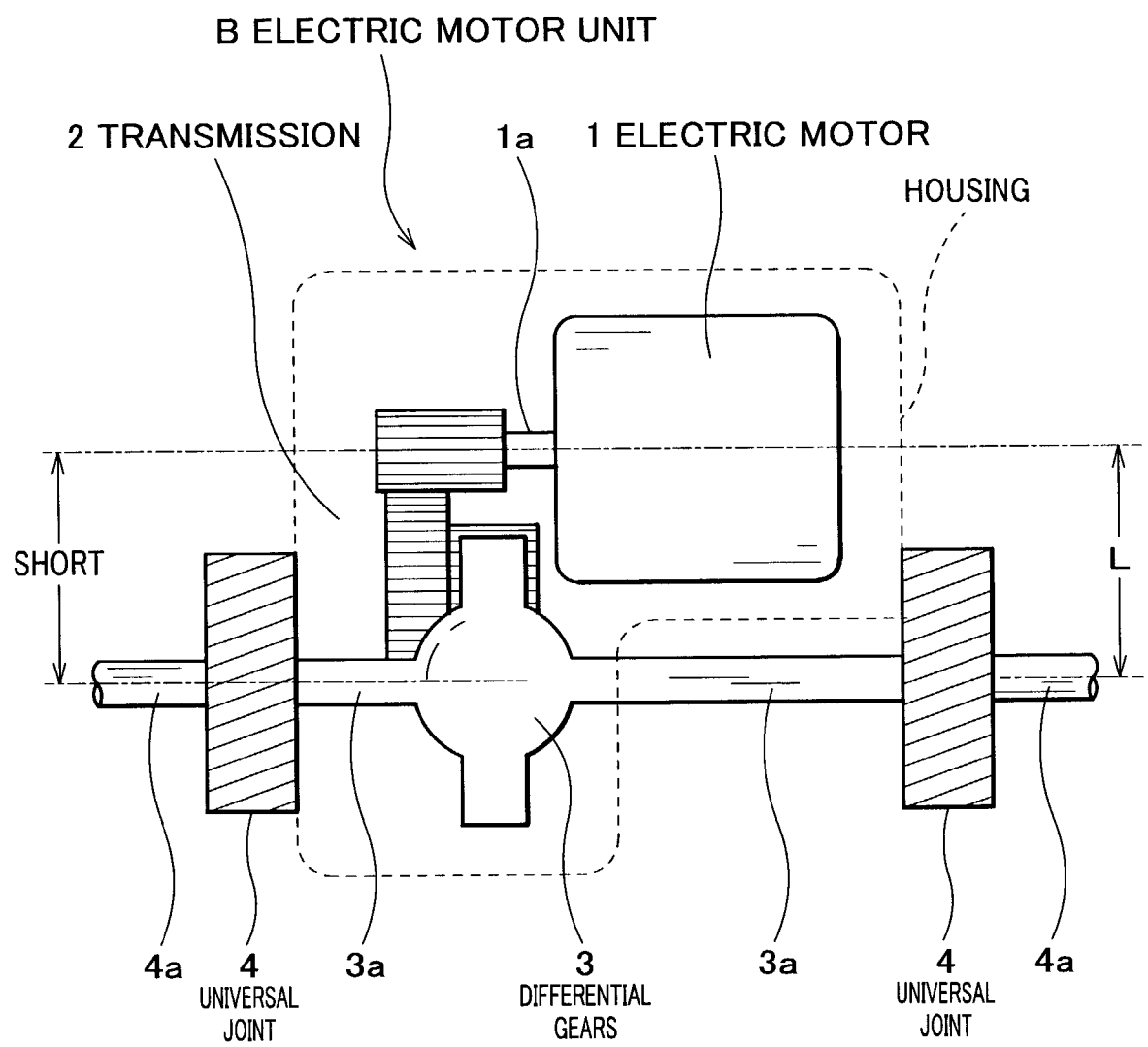
FIG. 3 is a schematic plan view of the electric motor unit of FIG. 1 including an electric motor, a transmission, and differential gears.

FIG. 1 is a diagrammatical vertical sectional view of a fuel cell electric vehicle to which is applied a motor structure according to the invention. FIG. 2 is a perspective view of an electric motor unit shown in FIG. 1. FIG. 3 is a schematic plan view of the electric motor unit.

As shown in FIG. 1, a fuel cell electric vehicle is provided with an electric motor 1, a transmission 2, differential gears 3, universal joints 4, a power control unit (hereinafter referred to as "PCU") 5, an air compressor 6 as an intake system, and a radiator 7, in a motor room R that is arranged at a front side of the vehicle. The vehicle is provided with a FC box 8 under the floor of a vehicle compartment and a capacitor 9 and a high pressure hydrogen storage tank 10 at a rear side of the vehicle. Of these, the electric motor 1, the transmission 2, and the differential gears 3 form the electric motor unit B. PCU 5 is positioned right above the electric motor unit B, and the air compressor 6 is positioned above the electric motor unit B so that sufficient space can be retained in the fore and aft direction of the electric motor unit B by effectively utilizing space extending above the electric motor unit B. In other words, accessories such as PCU 5 and the air compressor 6 are placed on the electric motor unit B so as to use the space effectively.

A fuel cell is accommodated in the FC box 8 so that oxygen supplied from the high pressure hydrogen storage tank 10 and air supplied from the air compressor 6 react to generate electricity. The capacitor 9 levels load fluctuation of the fuel cell. The radiator 7 cools the electric motor 1, the fuel cell, and the like.

As shown in FIG. 2, the electric motor unit B is an integrated structure when viewing from outside. In FIG. 2, the near side of the drawing faces to the rear side of the vehicle, and the far side of the drawing faces to the front side of the vehicle (viz. to the radiator 7). Therefore, the right-hand side of the drawing corresponds to the front right driving wheel side.

As seen in FIGS. 2 and 3, the electric motor 1 is in the form of a cylinder (substantially in the form of a complete cylinder), and forms a main part of the electric motor unit B. The transmission 2 is positioned at the left side of the electric motor 1, so that rotation force generated by the electric motor 1 is inputted through the rotating shaft 1a. The transmission 2 converts rotation speed of the rotating shaft 1a of the electric motor 1 and input the same to the differential gears 3 that is positioned at the rear left side of the electric motor unit B. The differential gears 3 adjust the difference of the rotation speed between right and left driving wheels W. Drive shafts 3a on the differential gears side that extend from the differential gears 3 to the driving wheels W are connected to outer side (wheel side) drive shafts 4a through universal joints 4.

The axis line of the rotating shaft 1a is parallel to the axis line of the drive shafts 3a, 4a.

Figure 6:
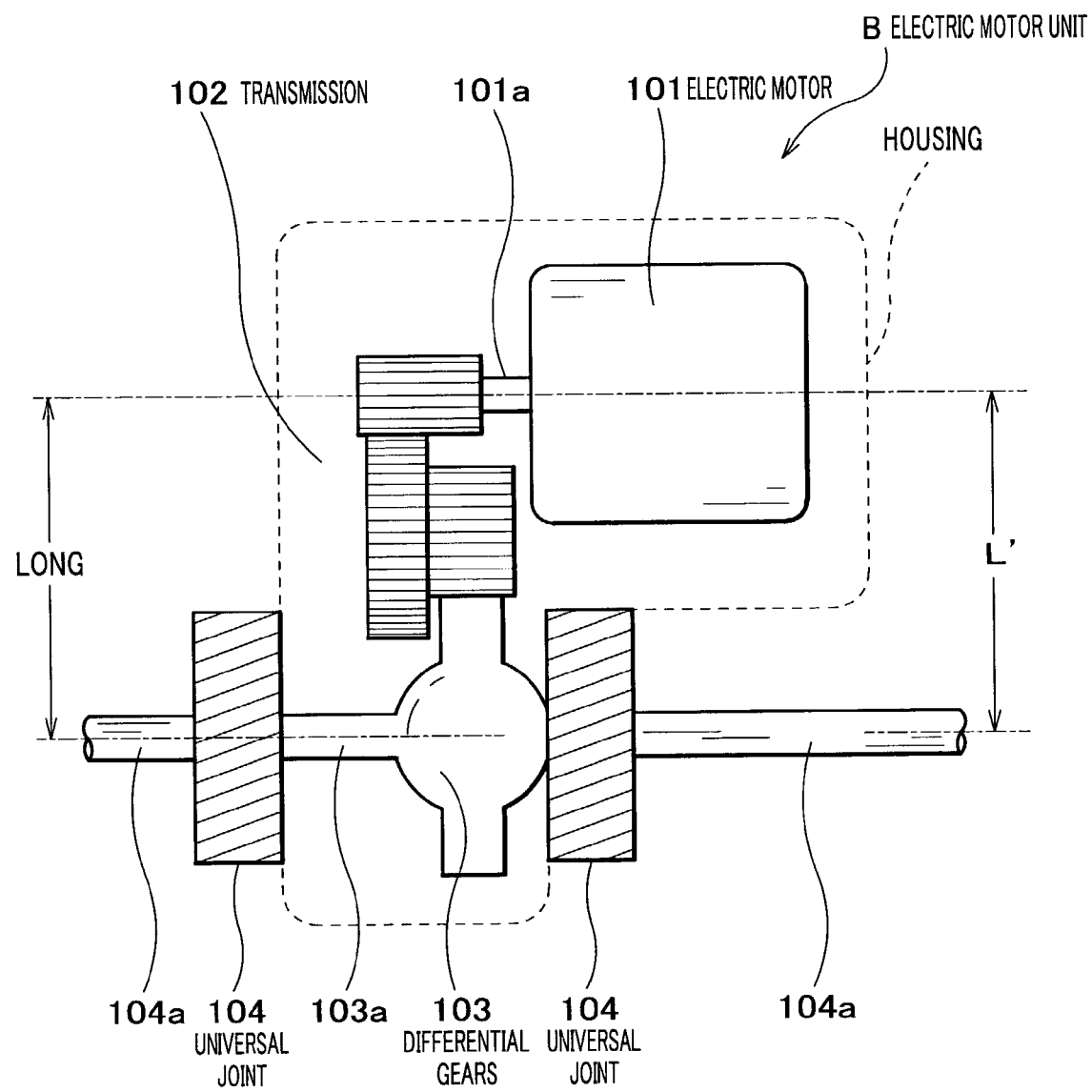
FIG. 6 is a schematic plan view of a conventional electric motor unit including an electric motor, a transmission, and differential gears.

As shown in FIG. 3, the right side universal joint 4 is supported by a supporting stay (not shown) fixed at the right side surface of the electric motor 1 (electric motor unit B). That is, the right side universal joint 4 is adjacent to the side surface (right side surface) of the electric motor 1 substantially in the form of a complete cylinder. As seen in FIG. 6 illustrating a prior art example, if the universal joint 4 is supported at a near side (outer cylindrical surface) of the electric motor 1 (101) instead of at the side surface, sufficient stiffness is required at this surface to support the universal joint 4 (104), leading to increased thickness of the electric motor B at the outer cylindrical surface. This makes it impossible to arrange the rotating shaft 1a of the electric motor 1 and the drive shafts 3a, 4a adjacently to each other. According to the invention, since the thickened portion to support the universal joint 4 is arranged at the side surface of the electric motor 1, it is possible to arrange the rotating shaft 1a of the electric motor 1 and the drive shafts 3a, 4a adjacently to each other, see the distances L, L' between the shafts shown in FIGS. 3 and 6.

Therefore, more space is available for the crushable zone and the maintenance space or for the vehicle compartment.

Figure 4A:
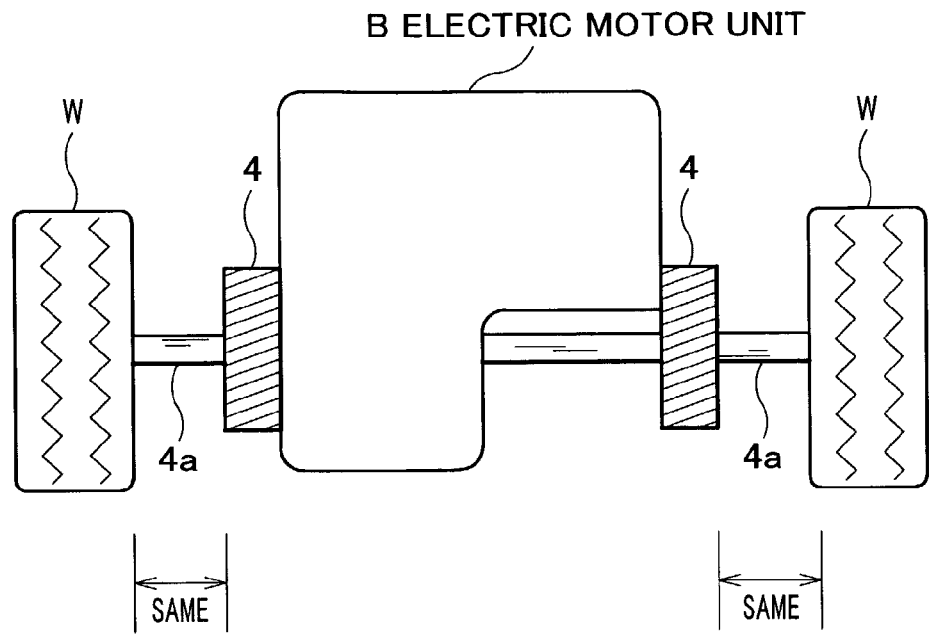
FIG. 4A is a schematic plan view comparing lengths of right and left drive shafts according to the invention.
Figure 4B:
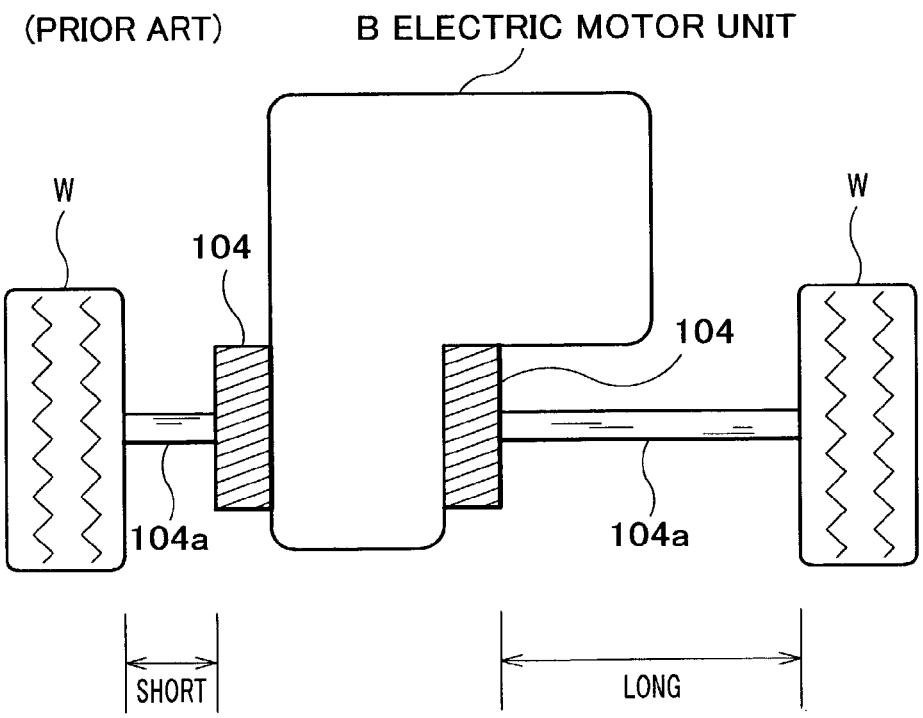
FIG. 4B is a schematic plan view comparing lengths of right and left drive shafts according to prior art.

Further, according to the invention, the drive shafts 4a on right and left wheel sides may have the same length as illustrated in FIG. 4A. In the prior art example shown in FIG. 4B, the drive shafts 104a on right and left wheel sides are different in the torsion amount due to the difference in lengths of the drive shafts 104a. However, in the preferred embodiment of the invention, since the torsion amount is the same in both drive shafts 4a on right and left wheel sides, the running behavior of the vehicle will be stable during the drive of the vehicle.

Further, as seen in FIG. 1, accessories such as PCU 5, an air compressor 6 are placed on the electric motor unit B, and the radiator 7 as cooling means of the fuel cell electric vehicle is positioned at the front side of the vehicle while the electric motor unit B is positioned behind the radiator 7. Herein, the term "accessories are placed on the electric motor unit B" means the same as described above, and this makes it possible to ensure space around the electric motor unit B. Meanwhile, the reason why "the electric motor unit B is positioned behind the radiator 7" is to prevent the cooling capacity of the radiator 7 from being deteriorated due to interruption of a flow of wind toward the radiator 7 by arranging the electric motor unit B in front of the radiator 7. Therefore, by positively arranging the electric motor unit B behind the radiator 7, sufficient amount of air is led to the radiator 7 and wind passing through the radiator 7 (air distribution) can be distributed around the electric motor unit B that is compactly made.

Figure 5A:
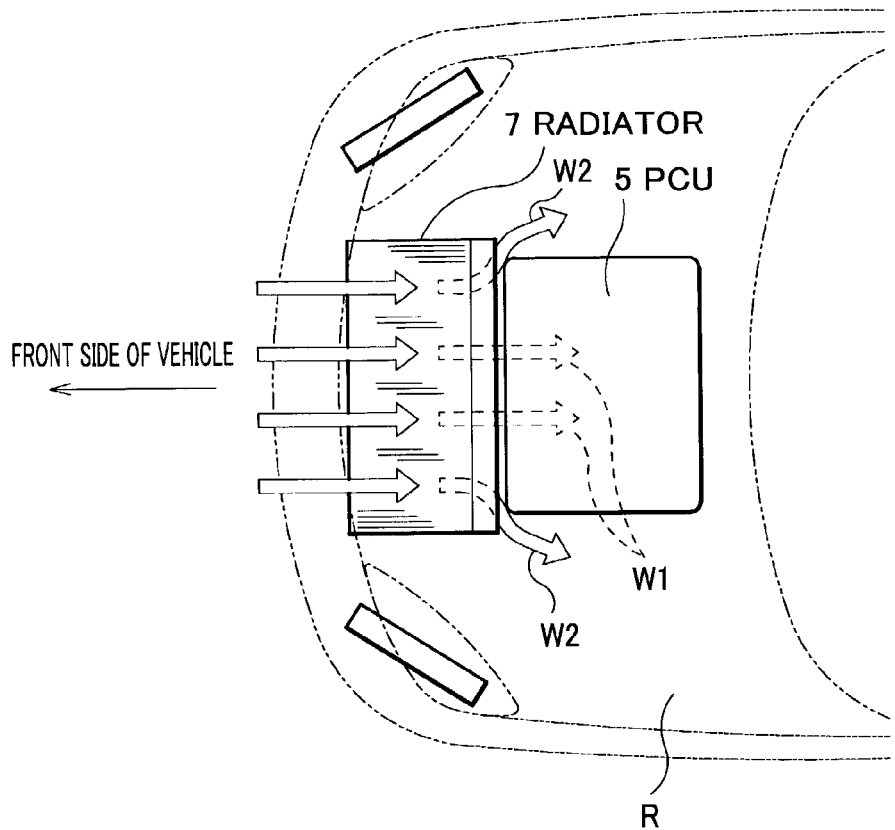
Figure 5B:
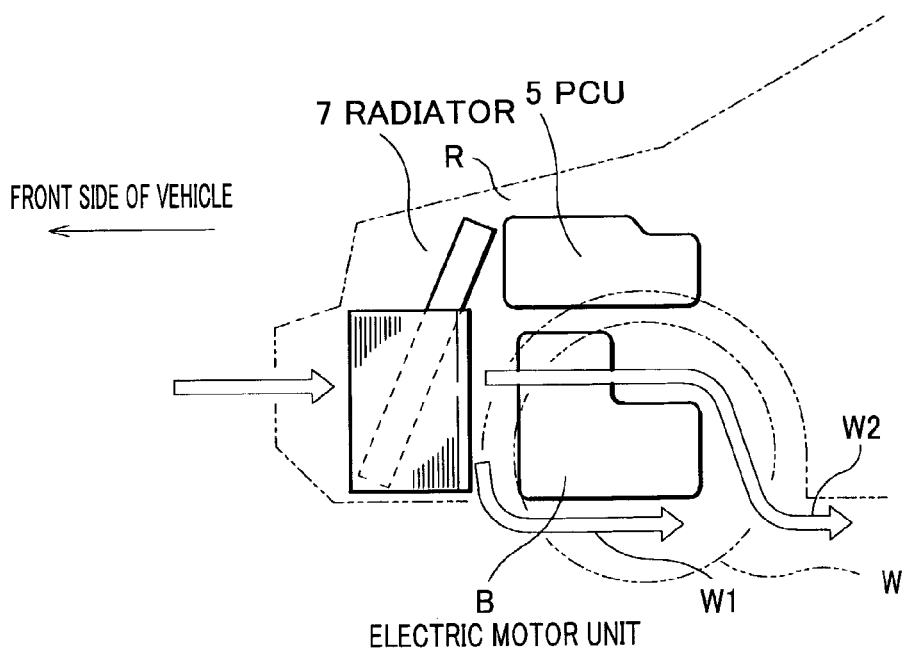

With reference to FIGS. 5A and 5B, air distribution of the radiator 7 will be described. FIG. 5A is a diagrammatical sectional plan view of a motor room, and FIG. 5B is a diagrammatical sectional side view of the motor room.

As shown FIGS. 5A and 5B, wind passing through the radiator 7 hits against the electric motor unit B and detours along the electric motor unit B in right and left directions. Also, wind passing through the radiator 7 is oriented downward so as to detour along the electric motor unit B in the downward direction. Herein, the flow of air flowing under the electric motor unit B is a mainstream w1, and the flow of air flowing in the right and left directions of the electric motor unit B is a sidestream w2.

The fuel cell electric vehicle is better than the vehicle equipped with a gasoline engine in terms of energy efficiency. However, in the fuel cell electric vehicle, generated heat is exhausted through water (generated by electrochemical reaction) that is a heating medium. That is, the amount of heat exhaustion is small. Meanwhile, in the gasoline engine, most of the generated heat can be exhausted as high temperature exhaust gas. That is, the amount of heat exhaustion is large. Further, in the fuel cell electric vehicle, about 80° C. heat is exhausted (in the case of a PEM fuel cell). Therefore, it is difficult to exhaust heat effectively due to smaller temperature difference relative to the ambient air. Meanwhile, in the gasoline engine, high temperature heat having a greater temperature difference relative to the ambient air can be exhausted. Therefore, it is possible to exhaust heat effectively.

For the reasons set forth above, the fuel cell electric vehicle requires a large-sized radiator 7 (with a large surface area). As best seen in FIGS. 1 and 5B, the radiator 7 is arranged diagonally. This is to arrange the radiator 7 in the motor room R such that the utmost surface area of the radiator 7 is retained without increasing the height.

Unlike an electric vehicle equipped with a battery, the fuel cell electric vehicle requires more install space because an intake/exhaust system for the fuel cell, such as an air compressor 6, a silencer, and an intake/exhaust module, is arranged as various structures.

In other words, a larger radiator 7 is required in the case of the fuel cell electric vehicle than in the case of other vehicles. Also, in the case of the fuel cell electric vehicle, more space is required in the motor room R because a number of equipment (accessories) has to be arranged in the motor room R.

In this regard, when viewing from above, the install space of the electric motor unit B, especially the install space in the fore and aft direction, is decreased according to the invention. This leads to increased space of the motor room R. Increasing space of the motor room R improves air distribution of the radiator 7 and thus the cooling efficiency of the radiator 7 in the end. Meanwhile, decreasing the install space of the electric motor unit B leads to extended space in the crushable zone or in the vehicle compartment. Working space for maintenance can also be readily retained.

While the invention has been described in detail with reference to a specific embodiment thereof, it will be apparent to one skilled in the art that various changes and modifications may be made without departing from the scope of the claims.

Although the present invention has been described as applying to a fuel cell electric vehicle, the invention is applicable to normal electric vehicles equipped with an electric motor and a secondary battery such as a nickel-metal hydride battery. The invention is also applicable to a hybrid vehicle (HEV), such as a series hybrid electric vehicle equipped with a traction motor and an engine for generating electricity so that the traction motor is driven by electric power generated at the engine. Of course, the invention may be applied to other hybrid vehicles such as a parallel hybrid electric vehicle or a sprit hybrid electric vehicle.

The fuel cell electric vehicle has been described as equipped with a high pressure hydrogen storage tank as a hydrogen supplying source. However, a storage tank made from hydrogen absorbing alloys may be employed. Also, a reformer which reforms hydrocarbon fuel and generates hydrogen may be employed. Of course, the fuel cell electric vehicle may or may not be equipped with an energy buffer such as a capacitor or a battery.

What is claimed is:

1. A motor structure of an electric vehicle, the electric vehicle being driven by an electric motor, comprising:
    an electric motor unit including a motor housing having a cylindrical housing portion for accommodating the electric motor, and a gear housing portion for accommodating differential gears, wherein the electric motor unit is driven by a fuel cell,
    accessories, including an intake system supplying air to the fuel cell, mounted onto the electric motor unit;
    a radiator positioned at a front side of the electric vehicle and in front of the electric motor unit; and
    a universal joint connecting a first drive shaft extending from the differential gears with a second drive shaft connected to a wheel of the electric vehicle,
    wherein said universal joint is adjacent to a radially extending side surface of the cylindrical housing portion of the motor housing, and an outer portion of the universal joint that is adjacent to the side surface extends by a first distance in a radial direction relative to the first drive shaft, and an inner portion of the electric motor that is closest to the first drive shaft in the radial direction is separated from the first drive shaft by a second distance that is less than the first distance.

2. A motor structure of an electric vehicle according to claim 1, wherein said accessories further include a power control unit controlling electric power from the fuel cell.

3. A motor structure of an electric vehicle according to claim 1, wherein drive shafts on right and left wheel sides have substantially the same length.

4. A motor structure of an electric vehicle according to claim 2, wherein drive shafts on right and left wheel sides have substantially the same length.

5. The motor structure of claim 1, wherein the universal joint is in contact with the cylindrical housing portion.

6. A motor structure of an electric vehicle, the electric vehicle being driven by an electric motor, comprising:
    an electric motor unit including a motor housing having a cylindrical housing portion for accommodating, the electric motor and a gear housing portion for accommodating differential gears, wherein the electric motor unit is driven by a fuel cell,
    accessories, including an intake system supplying air to the fuel cell, mounted onto the electric motor unit;
    a radiator positioned at a front side of the electric vehicle and in front of the electric motor unit; and
    a universal joint connecting a first drive shaft extending from the differential gears with a second drive shaft connected to a wheel of the electric vehicle,
    wherein said universal joint is positioned axially outward from a radially extending side surface of the cylindrical housing portion, and a portion of the universal joint overlaps a portion of the radially extending side surface in a radial direction relative to the electric motor.

7. The motor structure of claim 6, wherein a portion of the universal joint overlaps the side surface of the cylindrical housing portion.

8. The motor structure of claim 6, wherein the universal joint is adjacent to the side surface of the cylindrical housing portion.

9. The motor structure of claim 7, wherein the universal joint is in contact with the side surface of the cylindrical housing portion.

10. The motor structure of claim 1, wherein the universal joint is fixed to the motor housing.

11. The motor structure of claim 6, wherein the universal joint is fixed to the motor housing.

12. A motor structure of an electric vehicle, the electric vehicle being driven by an electric motor, comprising:
    an electric motor unit including a motor housing having a cylindrical housing portion for accommodating the electric motor, and a gear housing portion for accommodating differential gears,
    accessories mounted onto the electric motor unit;
    a radiator positioned at a front side of the electric vehicle and in front of the electric motor unit; and
    a universal joint connecting a first drive shaft extending from the differential gears with a second drive shaft connected to a wheel of the electric vehicle,
    wherein said universal joint is fixed to a radially extending side surface of the cylindrical housing portion of the motor housing, and an outer portion of the universal joint that is adjacent to the side surface extends by a first distance in a radial direction relative to the first drive shaft, and an inner portion of the electric motor that is closest to the first drive shaft in the radial direction is separated from the first drive shaft by a second distance that is less than the first distance.

13. A motor structure of an electric vehicle, the electric vehicle being driven by an electric motor, comprising:
- an electric motor unit including a motor housing having a cylindrical housing portion for accommodating, the electric motor and a gear housing portion for accommodating differential gears,
- accessories mounted onto the electric motor unit;
- a radiator positioned at a front side of the electric vehicle and in front of the electric motor unit; and
- a universal joint connecting a first drive shaft extending from the differential gears with a second drive shaft connected to a wheel of the electric vehicle,
- wherein said universal joint is positioned axially outward from and fixed to a radially extending side surface of the cylindrical housing portion, and a portion of the universal joint overlaps a portion of the radially extending side surface in a radial direction relative to the electric motor.

14. A motor structure of an electric vehicle, the electric vehicle being driven by an electric motor, comprising:
- an electric motor unit including a motor housing having a cylindrical housing portion for accommodating the electric motor, and a gear housing portion for accommodating differential gears, the differential gears coupling a motor shaft to a first drive shaft extending from the differential gears, wherein the first drive shaft is offset from and parallel to the motor shaft,
- accessories mounted onto the electric motor unit;
- a radiator positioned at a front side of the electric vehicle and in front of the electric motor unit; and
- a universal joint connecting the first drive shaft extending from the differential gears with a second drive shaft connected to a wheel of the electric vehicle,
- wherein said universal joint is adjacent to a radially extending side surface of the cylindrical housing portion of the motor housing, and an outer portion of the universal joint that is adjacent to the side surface extends by a first distance in a radial direction relative to the first drive shaft, and an inner portion of the electric motor that is closest to the first drive shaft in the radial direction is separated from the first drive shaft by a second distance that is less than the first distance.

* * * * *